United States Patent
Sankhavaram et al.

(10) Patent No.: US 11,023,696 B2
(45) Date of Patent: Jun. 1, 2021

(54) METHODS, SYSTEMS AND APPARATUS FOR DETECTING OBJECT LOCATION AND GENERATING ALERTS

(71) Applicant: SYMBOL TECHNOLOGIES, LLC, Lincolnshire, IL (US)

(72) Inventors: Sunalini Sankhavaram, Saratoga, CA (US); Christopher Wuest, Lincolnshire, IL (US); Guy Solimine, Morris Plains, NJ (US); Nicholas J. Ford, Parsippany, NJ (US); Vinh-Phuong T. Le, Fremont, CA (US); Edward W. Geiger, Lincolnshire, IL (US); Yu Wan, Sunnyvale, CA (US); Mahender R. Vangati, San Jose, CA (US); David Tan Nguyen, Morgan Hill, CA (US); Sudhakar Reddy, Lincolnshire, IL (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 16/505,685

(22) Filed: Jul. 8, 2019

(65) Prior Publication Data
US 2019/0332835 A1    Oct. 31, 2019

Related U.S. Application Data

(63) Continuation of application No. 15/248,518, filed on Aug. 26, 2016, now abandoned.

(51) Int. Cl.
G06K 7/10 (2006.01)
G06K 17/00 (2006.01)
(Continued)

(52) U.S. Cl.
CPC ..... G06K 7/10544 (2013.01); G06F 16/2455 (2019.01); G06K 7/10009 (2013.01);
(Continued)

(58) Field of Classification Search
CPC .......... G06K 7/10079; G06K 7/10089; G06K 7/10099; G06K 17/0029; G06Q 10/08;
(Continued)

(56) References Cited

U.S. PATENT DOCUMENTS 5,260,694 A    11/1993   Remahl
6,662,068 B1 *  12/2003  Ghaffari ............. G06K 19/0723
                                                     700/115
(Continued)

OTHER PUBLICATIONS

U.S. Appl. No. 15/218,721, filed Jul. 25, 2016.
U.S. Appl. No. 15/218,158, filed Jul. 25, 2016.

*Primary Examiner* — Suezu Ellis

(57) ABSTRACT

Methods, systems and apparatus for detecting object location and generating alerts are disclosed herein. An example disclosed method includes determining an assigned area for an object being handled by a loader; detecting a first location of the loader; determining whether the first location corresponds to the assigned area for the object; and in response to the first location not corresponding to the assigned area for the object, generating a first output indicative of a difference between the first location and the assigned area for the object.

9 Claims, 10 Drawing Sheets

(51) Int. Cl.
  *G06Q 10/08* (2012.01)
  *G06F 16/2455* (2019.01)
  *H04W 4/029* (2018.01)
  *H04W 4/02* (2018.01)
  *H04W 40/24* (2009.01)

(52) U.S. Cl.
  CPC ....... *G06K 17/0022* (2013.01); *G06Q 10/087* (2013.01); *H04W 4/02* (2013.01); *H04W 4/029* (2018.02); *H04W 40/244* (2013.01)

(58) Field of Classification Search
  CPC  G06Q 10/0833; G06Q 10/087; G01S 13/878; H01Q 1/2208; G01C 21/206; G08B 13/2462; G08B 21/0272
  USPC .......................................... 235/492, 451, 385
  See application file for complete search history.

(56) References Cited

U.S. PATENT DOCUMENTS

| | | |
|---|---|---|
| 9,020,946 B2 | 4/2015 | Siris |
| 2005/0216119 A1 | 9/2005 | Hamilton |
| 2007/0200701 A1 | 8/2007 | English et al. |
| 2009/0076646 A1* | 3/2009 | Chadbourne .......... G06Q 10/08 700/214 |
| 2010/0146587 A1 | 6/2010 | Sholes et al. |
| 2010/0213313 A1 | 8/2010 | Reed et al. |
| 2014/0372182 A1 | 12/2014 | Groble et al. |
| 2015/0308835 A1 | 10/2015 | Hansen et al. |
| 2015/0364017 A1 | 12/2015 | Hall et al. |
| 2016/0217361 A1 | 7/2016 | Schattmaier et al. |
| 2016/0371646 A1 | 12/2016 | Loverich et al. |
| 2017/0140330 A1* | 5/2017 | Rinzler .............. G06K 19/0723 |
| 2018/0282063 A1 | 10/2018 | Ueda |

\* cited by examiner

US 11,023,696 B2

METHODS, SYSTEMS AND APPARATUS FOR DETECTING OBJECT LOCATION AND GENERATING ALERTS

RELATED APPLICATION

This patent arises from a continuation of U.S. patent application Ser. No. 15/248,518, filed on Aug. 26, 2016, which is hereby incorporated herein by reference.

FIELD OF THE DISCLOSURE

This disclosure relates generally to wireless communication systems and, more particularly, to methods and apparatus for detecting object location and generating alerts.

BACKGROUND

Wireless communication systems, such as radio frequency identification (RFID) systems, are utilized in different environments and applications. For example, RFID systems are utilized for product tracking, product identification and, more generally, inventory control in manufacturing, warehouse, transportation and retail environments. Some RFID systems include one or more tags and one or more readers. The tags transmit radio frequency (RF) signals that are readable by the reader. The signals transmitted by the tag typically include or convey identification information corresponding to, for example, an object associated with the tag. For example, the tag may be carried by (e.g., adhered to, mounted to, attached to, fixed to, or integrated with) a product, a label, a package, packaging, a person, or any other suitable object. The reader receives the signal transmitted by the tag and processes (e.g., stores, displays, communicates or otherwise processes) data conveyed via the signal.

DETAILED DESCRIPTION

Figure 1:
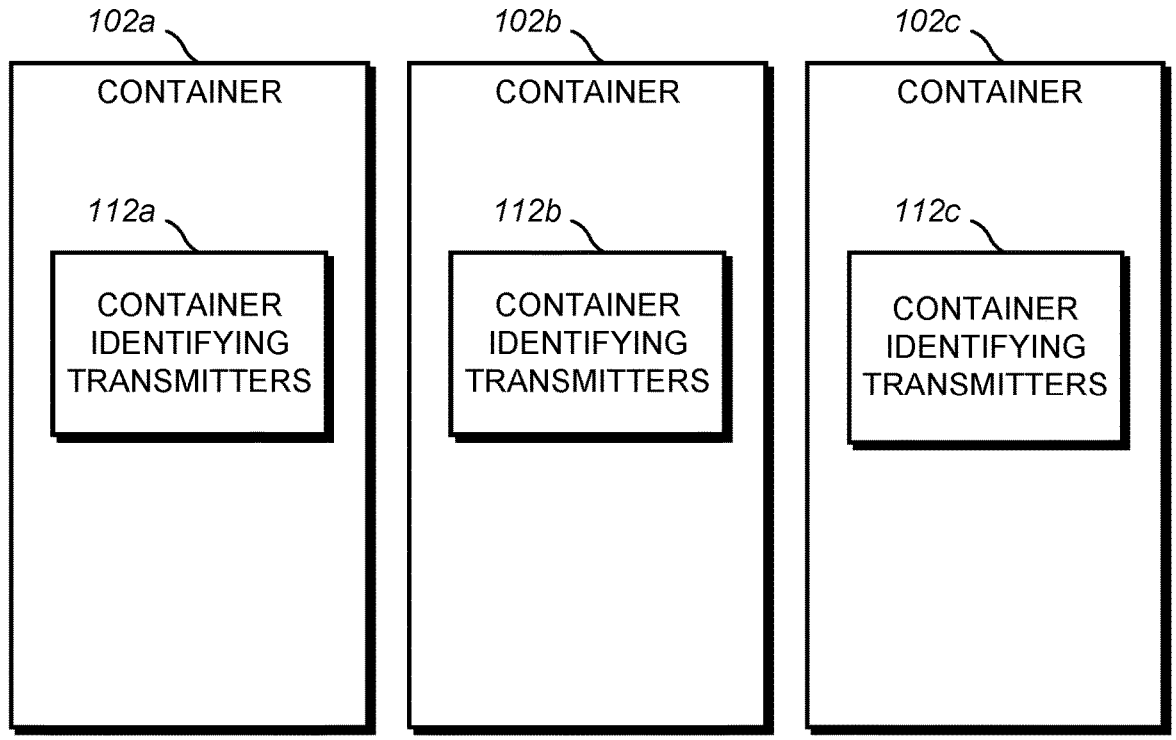
FIG. 1 depicts an example environment including an example locating system constructed in accordance with teachings of this disclosure.
Figure 1:
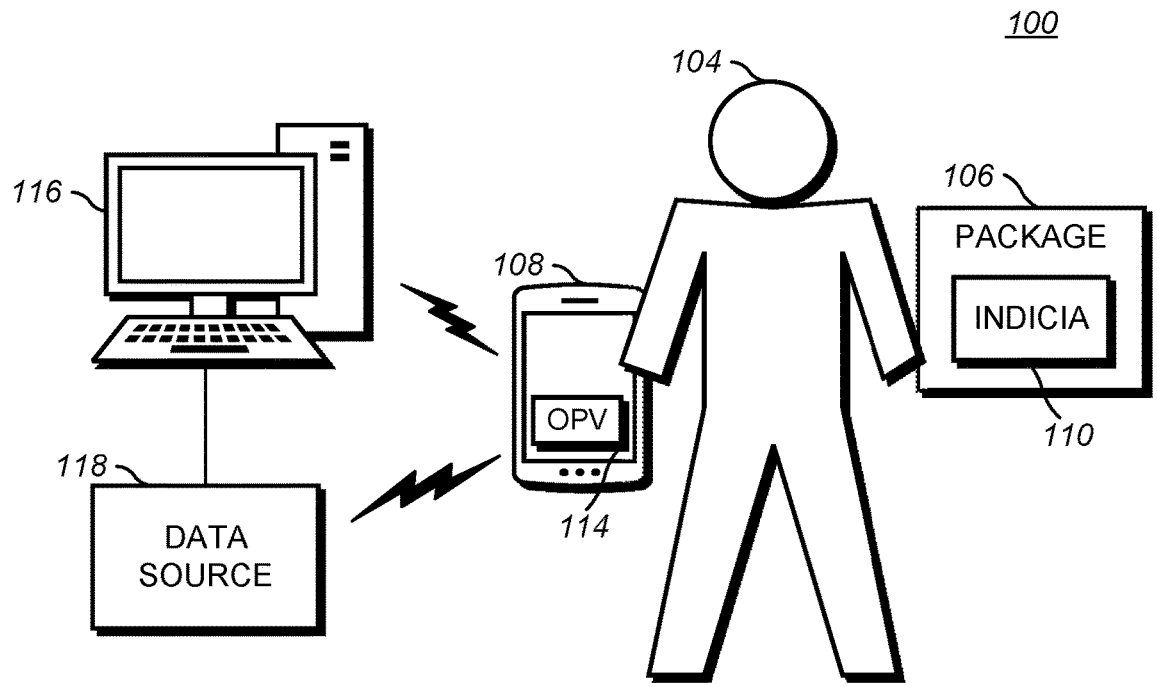

Advancements in communication technology, such as Internet-based purchasing and ordering, have increased the number of consumers and enterprises that rely on accurate and timely delivery of goods and materials. In turn, demands on those tasked with providing such services have amplified. In addition to greater volumes of packages to be delivered, allotted delivery times have shortened to meet demand as the transportation and logistics industry grows and competition intensifies. Moreover, many entities operate under guarantees in terms of accurate and timely delivery of packages, thereby heightening the importance of accurate and timely performance.

To meet these and other challenges, transportation and logistics entities seek improvements across different aspect of various operations. For example, the process of loading packages into containers (e.g., delivery truck trailers, package cars, aircraft loading units, or rail cars) involves determining which packages should be loaded onto which containers, assigning the packages to the determined containers, informing loaders (e.g., persons or machines tasked with physically placing the packages into the containers) of the assigned container for the individual packages, and loading of the packages into the proper containers by the loaders. In many instances, the loader is faced with high volumes of packages and strict time constraints. Moreover, a loading dock may include a plurality of different containers that are difficult to distinguish on a consistent basis due to, for example, the containers having similar markings, poor visibility conditions, and proximity of openings into the different containers.

Of course, problems arise when a package is placed into an incorrect container. As the different containers likely have different destinations, the incorrectly loaded package may not arrive at the correct destination on time and additional cost associated with special handling may be incurred. Additionally, the incorrectly loaded package occupies valuable space in the incorrect container, which could have otherwise transported additional correctly loaded packages. Additionally, packages are often assigned to the containers in accordance with a route optimization algorithm and the driver has expectations of particular packages being in the container as the driver progresses through the route. Thus, the driver may travel to a destination of package only to find the package missing from the container. In such instances, delivery of other packages in the container are negatively affected by incorrect loading of the package at the loading dock.

While the foregoing explains challenges associated with package loading and delivery, similar challenges exist in other environments and applications that involve a need for accurate and efficient placement of objects in assigned locations. For example, inventory stocking operations and warehouse management operations suffer when objects are not accurately placed in assigned locations.

Example methods, systems and apparatus disclosed herein improve accuracy and efficiency of applications involving placement of objects in assigned locations. In particular, examples disclosed herein detect an event indicative of an incorrect placement of an object. Additionally, examples disclosed herein provide one or more alerts that draw attention to the detected event. Notably, examples disclosed herein detect the event and provide the alert immediately (e.g., during the event or seconds after the event) such that the error can be corrected or altogether avoided. To continue the above transportation and logistics scenario, examples disclosed herein detect an entrance or presence of a loader handling a package in a first container, despite the package having been assigned to a second container different than the first container. For example, while carrying a package destined for a first city, the loader may mistakenly walk into a container bound for a second, different city. In such instances, examples disclosed herein detect that the loader has entered the incorrect container and alert the loader to the mistake that has occurred or that is about to occur.

To detect an event indicative of an incorrect placement of an object, example systems disclosed herein include wireless transmitters mounted in different areas (e.g., containers, portals, etc.) and mobile computing devices (e.g., wearable computing devices to be worn by a package loader) capable of receiving transmissions from the wireless transmitters. Example mobile computing devices disclosed herein are configured to determine an assigned location for the object by, for example, obtaining an identification code carried by the object and querying a database having location assignment information. For example, mobile computing devices disclosed herein include or are in communication with a reader capable of reading an identification code (e.g., indicia, a barcode, a RFID transponder, or machine readable text) carried by a tag adhered to the object.

Example mobile computing devices disclosed herein utilize transmissions received from the wireless transmitters to detect events indicative of a placement of the object in a particular area. For example, mobile computing devices disclosed herein detect entrance of the mobile computing device (and, thus, a carrier of the mobile computing device) into the particular area based on receipt of transmissions from one or more specific wireless transmitters dedicated to that particular area. Using identification information associated with the particular area and the determined assigned location for the object, example mobile computing devices disclosed herein determine whether the object is being incorrectly placed. If so, example mobile computing devices disclosed herein generate an alert by, for example, causing an output device to generate an alert, thereby avoiding the realization of the detected error. Instead, the loader can respond to the alert by relocating the object to the assigned location for that object.

While example methods, systems and apparatus disclosed herein are described below in connection with package loading operations at a loading dock, example methods, systems and apparatus disclosed herein can be implemented in any other suitable context or environment such as, for example, a distribution center, a warehouse, a factory, a farm, a retail establishment, an airport, a train loading location, or a shipping port. Moreover, while example methods, systems and apparatus disclosed herein are described below using terminology associated with packaging loading operations at a loading dock, example methods, systems and apparatus disclosed herein are applicable to alternative environments involving different terminology. For example, while examples described below include determining whether a loader is located in a particular container and determining an assigned container for a package, examples disclosed herein may apply to any suitable type of user and determining whether such a user is located in any suitable type of area, location, or position and determining an assigned area, location or position for any suitable type of object.

FIG. 1 illustrates an example environment in which example methods, systems and apparatus disclosed herein may be implemented to detect incorrect placement of objects and to generate alerts indicative of such detections. The example of FIG. 1 is representative of a loading dock 100 including a first, second and third containers 102a-c each bound for a different destination. For example, the first container 102a is bound for Lincolnshire, Ill., the second container 102b is bound for Holtsville, N.Y., and the third container 102c is bound for Agoura Hills, Calif. In the example of FIG. 1, a loader 104 is tasked with loading packages, one of which is shown with reference numeral 106, into the containers 102a-c. While the loader 104 of FIG. 1 is a person, alternative examples include one or more machines programmed as loaders of the packages into the containers 102a-c.

In the example of FIG. 1, the loader 104 carries a mobile computing device 108 configured to assist the loader 104 in the task of loading packages into the containers 102a-c. The example mobile computing device 108 of FIG. 1 is a wearable device capable of being mounted to or otherwise carried by the loader 104. For example, the mobile computing device 108 is mountable to a forearm of the loader 104 (e.g., via one or more straps), a head of the loader 104 (e.g., as a heads up display (HUD) device), or an article of clothing worn by the loader 104 (e.g., via a belt clip). Alternatively, the mobile computing device 108 may be carried by a hand of the loader 104 during package loading operations. As described in greater detail below, the example mobile computing device 108 includes data capture device capable of obtaining identifying information from, for example, indicia 110 printed on or adhered to the package 106. Additionally, the example mobile computing device 108 an antenna to receive wireless transmissions, a logic circuit (e.g., the processing platform 1000 of FIG. 10) capable of processing information, and a user interface having one or more output components capable of generating alerts. Additionally or alternatively, the example mobile computing device 108 may communicate with one or more external output components capable of generating alerts.

To facilitate proper loading of packages by the loader 104, an example locating system constructed in accordance with teachings of this disclosure is implemented at the loading dock 100. The example locating system of FIG. 1 includes container identifying transmitters (CITs) 112a-c implemented on the containers 102a-c and an object placement verifier (OPV) 114 implemented on the example mobile computing device 108. While the example of FIG. 1 includes a plurality of CITs 112 in each of the containers 102a-c, one or more of the containers 102a-c may include a single CIT 112 or no CITs. In the example of FIG. 1, each of the containers 102a-c includes a group of the CITs 112, which are each configured to transmit data indicative of a corresponding one of the containers 102a-c. In particular, first CITs 112a transmit data indicative of the first container 102a, second CITs 112b transmit data indicative of the second container 102b, and third CITs 112c transmit data indicative of the third container 102c. As such, a processing device, such as the mobile computing device 108, that receives a transmission from one of the first CITs 112a is capable of identifying the received transmission as originating from the first container 102a.

In the example locating system of FIG. 1, the CITs 112a-c are arranged and configured such that the transmissions of each group of CITs 112a-c are not readable outside of the corresponding one of the containers 102a-c. In particular, the CITs 112a-c are arranged to direct transmissions into an interior space of the corresponding container 102a-c and configured to limit a broadcast strength of the transmissions according to one or more dimensions of the interior space of the corresponding container 102a-c. Additionally, as described in detail below, the example CITs 112a-c include various RF propagation patterns to enable improved accuracy with low latency within the corresponding container 102a-c. Due to the arrangement and configuration of the CITs 112a-c disclosed herein, the mobile computing device 108 is unlikely to receive transmissions from the second CITs 112b when the mobile computing device 108 is located in the first container 112a. Additionally, due to the arrangement and configuration of the CITS 112a-c disclosed herein, the mobile computing device 108 can be worn by the loader 104 in any desirable orientation. The example CITs 112 are discussed further below in connection with FIGS. 2-6.

The example OPV 114 of FIG. 1 utilizes the CITs 112a-c to verify that the package 106 is being loaded into the correct one of the containers 102a-c. To determine a correct one of the containers 102a-c for the package 106, the example OPV 114 of FIG. 1 identifies the package 106 via, for example, the indicia 110. For example, the loader 104 uses the data capture device of the mobile computing device 108 to image or scan the indicia 110. Alternatively, the loader 104 uses a data capture device of a workstation 116 to image or scan the indicia 110, and the workstation 116 communicates the captured data to the mobile computing device 108. In the illustrated example, the mobile computing device 108 sends identifying information (e.g., a universal identifier, a stock keeping unit (SKU), a universal product code (UPC), an address, a physical size, a weight, identification of hazardous materials, or special handling instructions) provided by the indicia 110 as a query to a data source 118. The data source 118 is implemented on, for example, the workstation 116, the mobile computing device 108, and/or a server accessible over a network. In the illustrated example, the data source 118 returns an assigned one of the containers 102a-c for the package 106. The assignment of the package 106 is based on, for example, a route optimization algorithm.

To detect which one of the containers 102a-c the loader 104 enters while handling the package 106, the example OPV 114 of FIG. 1 listens for transmissions generated by the CITs 112 and determines a location of the loader 104 based on received transmission. For example, when the mobile computing device 108 is receiving beacons corresponding to the first CITs 112a, the example OPV 114 determines that the mobile computing device 108 (and, thus, the loader 104 handling the package 106) is located in the first container 102a.

The example OPV 114 of FIG. 1 compares the current location of the loader 104 to the assigned one of the containers 102a-c for the package 106. If the loader 104 has entered one of the containers 102a-c other than the assigned one of the containers 102a-c for the package 106, the example OPV 114 of FIG. 1 generates a first alert, such as an audio alert and/or a visual alert. Additionally or alternatively, if the loader 104 has entered the assigned one of the containers 102a-c for the package 106, the example OPV 114 of FIG. 1 generates a second alert different than the first alert. Accordingly, the example OPV 114 alerts the loader 104 to the potential incorrect placement of the package 106, thereby affording the loader 104 an opportunity to avoid placing the package 106 in an incorrect one of the containers 102a-c.

Figure 2:
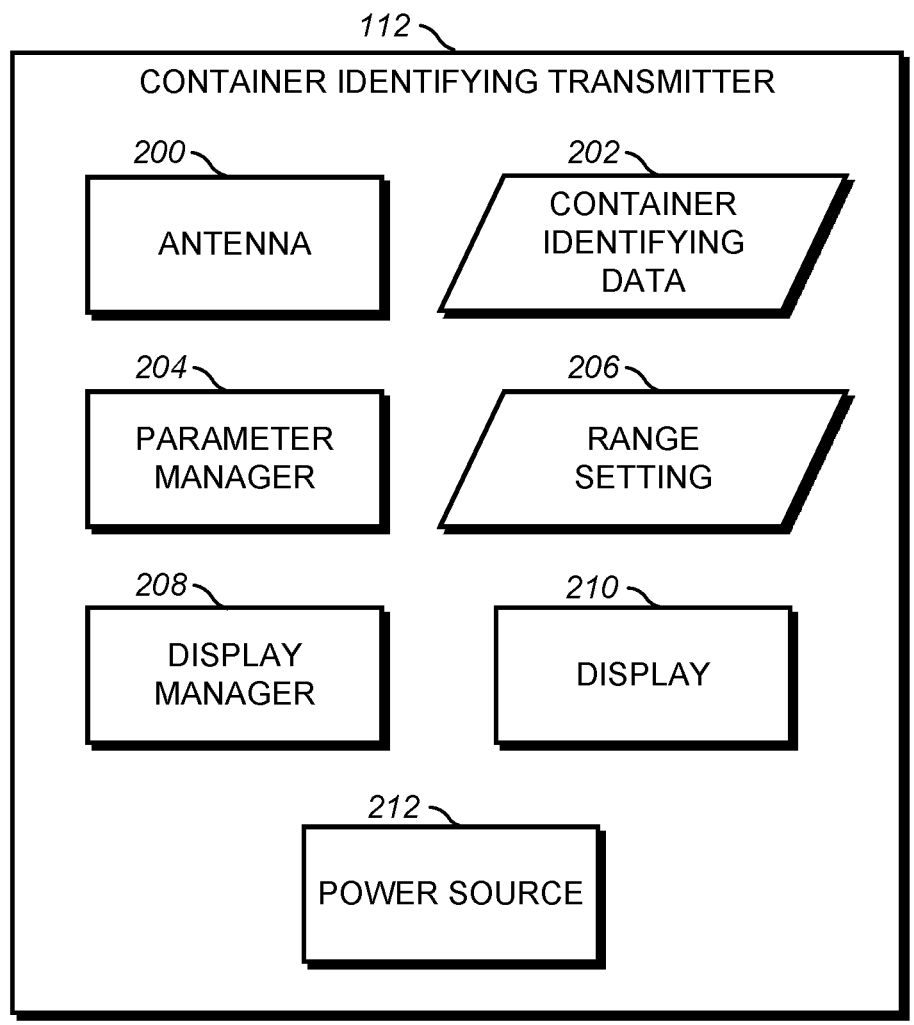
FIG. 2 is block diagram representative of an example implementation of the example container identifying transmitters (CITs) of FIG. 1.

FIG. 2 is a block diagram representative of an example implementation of one of the CITs 112a-c of FIG. 1. For ease of reference, the example CIT 112 of FIG. 2 corresponds to one of the CITs 112a implemented on the first container 102a. The example CIT 112 of FIG. 2 is implemented by, for example, a Bluetooth® low energy (BLE) device configured to generate beacons at defined intervals (e.g., adjustable intervals beginning with one hundred (100) milliseconds (ms)). To generate the beacons, the example CIT 112 of FIG. 2 includes an antenna 200. In some examples, the antenna 200 is omnidirectional. In some examples, the antenna 200 is a directional antenna such that beams carrying the beacons generated by the CIT 112 can be directed to an interior space of the first container 102a. In some examples, the antenna 200 of certain ones of the first CITs 112a is a first type of directional antenna having a first radiation pattern, and the antenna 200 of certain other ones of the first CITs 112a is a second type of directional antenna having a second radiation pattern. To focus the beams carrying the beacons into the interior space of the first container 102a, CITs 112a having the first radiation pattern are positioned differently than CITs 112a having the second radiation pattern. That is, in some examples, the type of radiation pattern for each of the CITs 112a depends on, for example, a position at which the CITs 112a are mounted on the container 102a. Example directional configurations and arrangements for the CITs 112 are described in detail below in connection with FIGS. 3-6.

In the example of FIG. 2, the beacons transmitted by the antenna 200 carry container identifying data 202. As the example CIT 112 of FIG. 2 corresponds to one of the first CITs 112a of FIG. 1, the container identifying data 202 of FIG. 2 is indicative of the first container 102a. The container identifying data 202 of FIG. 2 is programmable by a parameter manager 204 of the CIT 112. The example parameter manager 204 of FIG. 2 receives instructions and/or data from, for example, the mobile computing device 108, the workstation 116 or any other suitable processing device, regarding a value for the container identifying data 202. The example parameter manager 204 stores the received value as the container identifying data 202. As such, the example CIT 112 can be reprogrammed to correspond to a different container when, for example, the CIT 112 is deployed on a different container.

Additionally, the example parameter manager 204 of FIG. 2 manages a range setting 206 of the CIT 112. The range setting 206 controls the transmit power or broadcast strength of the signals carrying the beacons. For example, the range setting 206 corresponds to a transmit power for the antenna 200. That is, the range setting 206 controls a propagation distance of the beacons transmitted by the antenna 200 by selecting a transmit power for the antenna 200. The range setting 206 is based on, for example, one or more dimensions (e.g., height, depth, width, and/or RF obstruction or attenuation of a surrounding environment or volume) of the first container 102a. If the CIT 112 is deployed on a different container having different dimensions, the parameter manager 204 updates the range setting 206. Accordingly, the example CIT 112 is programmable to limit (e.g., minimize) the detectability of the beacons outside of the first container 102a. Thus, despite the second container 102b being proximate to the first container 102a, the beacons generated by the first CITs 102a are not likely to be detected by a device (e.g., the mobile computing device 108 of FIG. 1) located in the second container 102b. In some examples, the range setting 206 for a particular one of the CITs 112a depends on a position at which that particular one of the CITs 112a is mounted on the container 102a. For example, the range setting 206 of a certain ones of the first CITs 112a is a first value, and the range setting 206 of certain other ones of the first CITs 112a is a second value. Example range settings and arrangements for the CITs 112 are described in detail below in connection with FIGS. 3-6.

The example CIT 112 of FIG. 2 includes a display manager 208 to control a display 210. In the illustrated example, the display 210 includes one or more light emitting diodes (LEDs) that indicate a mode or state of the CIT 112.

For example, the CIT 112 includes an airplane mode, a configuration mode, a sleep mode, and a transmit mode. In some examples, the CIT 112 includes a switch to control the current mode. The display manager 208 determines a current mode of the CIT 112 and causes the display 210 to generate an output indicative of the current mode. For example, each mode is assigned a color and/or pattern of flashes for the display 210. In some examples, the indication of the selected mode occurs at a time of the selection.

The example CIT 112 of FIG. 2 includes a power source 212, such as a battery. The example CIT 112 of FIG. 2 may provide information regarding the power source 212. For example, the mobile computing device 108 communicates with the CIT 112 to determine a status of the power source 212. The status of the power source 212 is indicative of, for example, a remaining lifetime of the power source 212 and can be used to understand whether a replacement CIT is required or will be required in a particular time frame. The example CIT 112 of FIG. 2 includes a programmable auto sleep mode in which the CIT 112 transmits for a programmable amount of time and returns to sleep mode. The programmable auto sleep mode conserves battery life for extending a useful life of the CIT 112.

Figure 3:
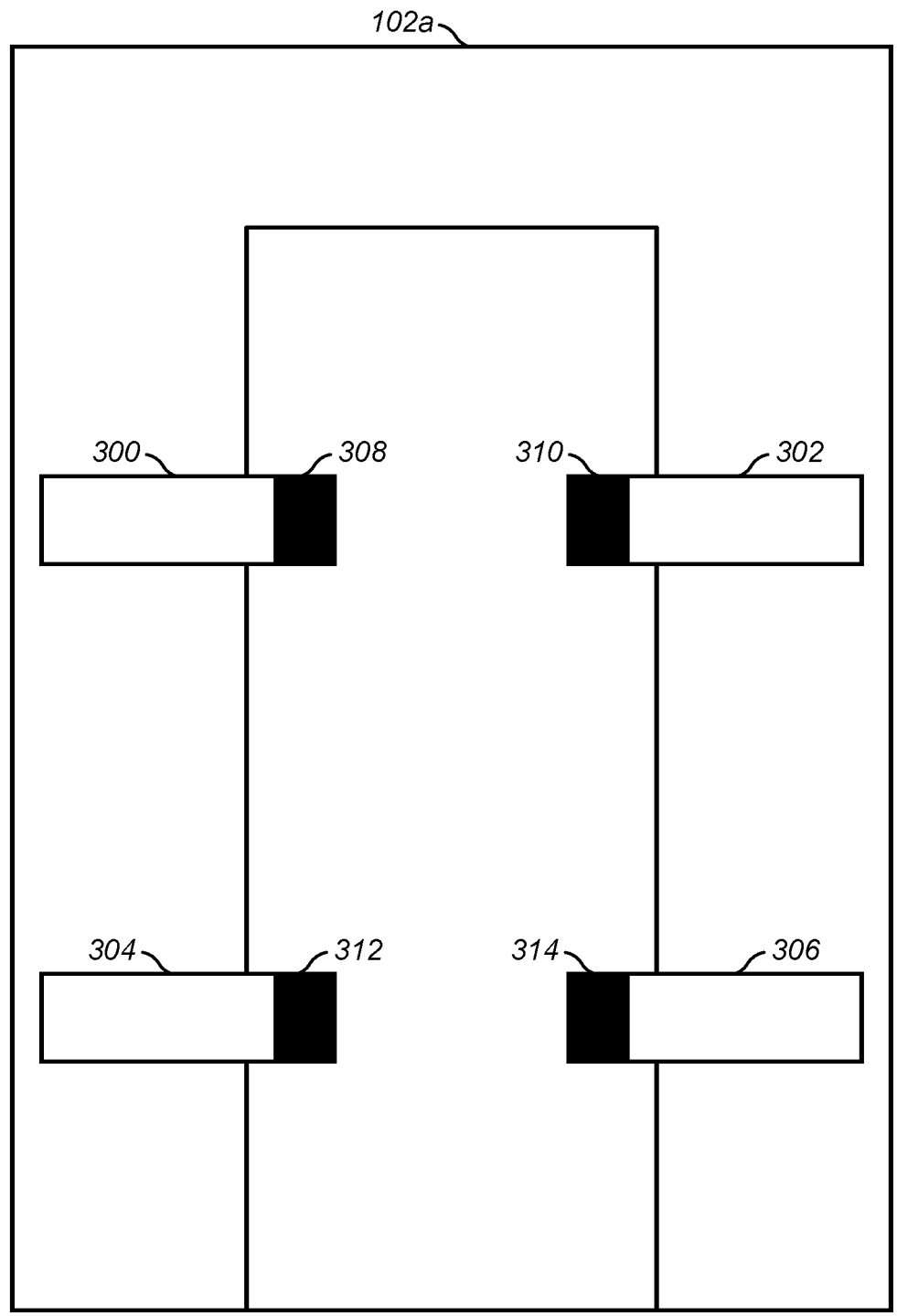
FIG. 3 is an end view of a container including an example arrangement for the example CITs of FIG. 1
Figure 4:
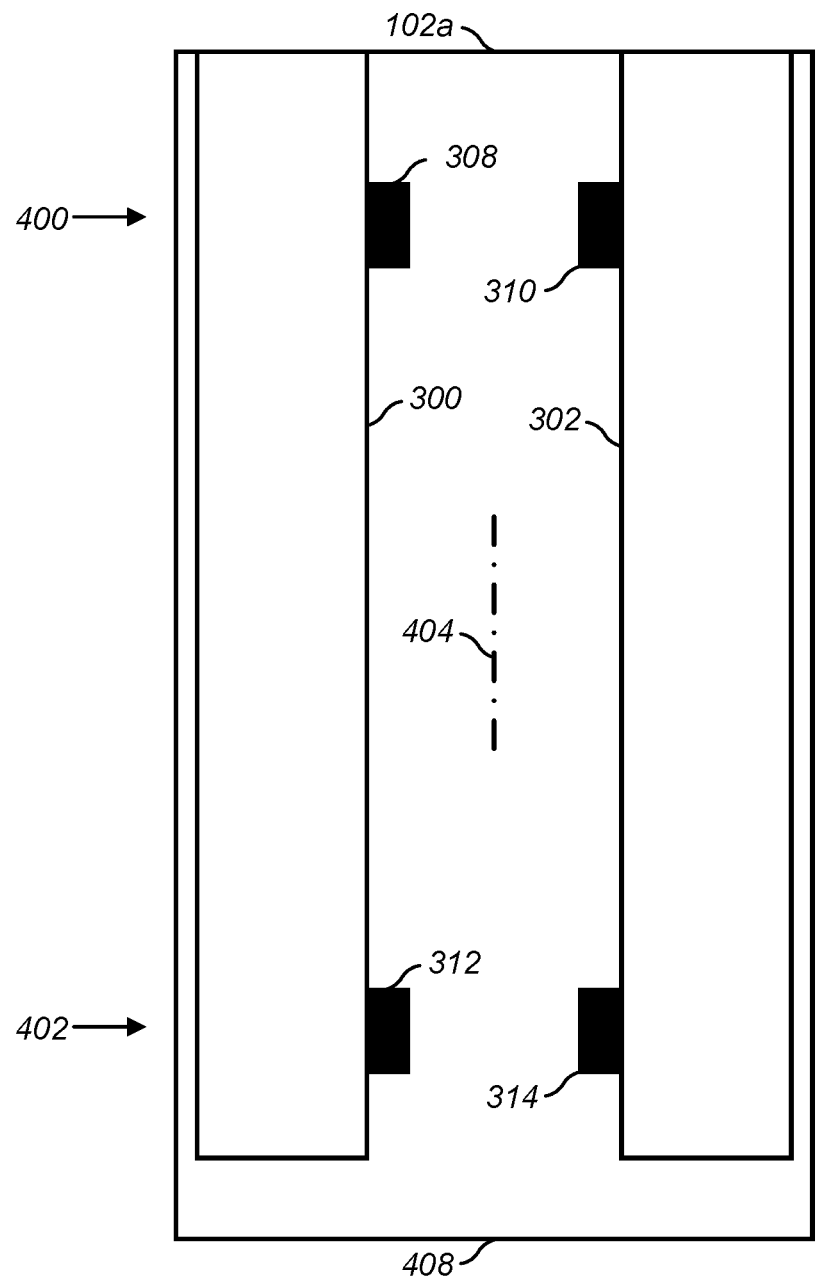
FIG. 4 is a top view of the container of FIG. 3.

FIGS. 3 and 4 illustrate an example arrangement of the first CITs 112a of FIG. 1 on the first container 102a. In particular, FIG. 3 is an end view, looking into the first container 102a and FIG. 4 is a top view, looking down on the first container 102a. In the illustrated example, the container 102a includes a left upper shelf 300, a right upper shelf 302, a left bottom shelf 304, and a right bottom shelf 306. In the illustrated example, a first CIT 308 is mounted to the left upper shelf 300, a second CIT 310 is mounted to the right upper shelf 302, a third CIT 312 is mounted to the left bottom shelf 304, and a fourth CIT 314 is mounted to the right bottom shelf 306. As shown in FIG. 4, the first and the second CITs 308 and 310 are mounted in a front region 400 of the container 102a and the third and fourth CITs 312 and 314 are mounted in a rear region 402 of the container 102a. While the illustrated example of FIGS. 3 and 4 are referred to using relative terms (e.g., upper, lower, right, left, front, and rear), these terms are used for clarity and any spatial relationship between alternative arrangements are possible.

Figure 5:
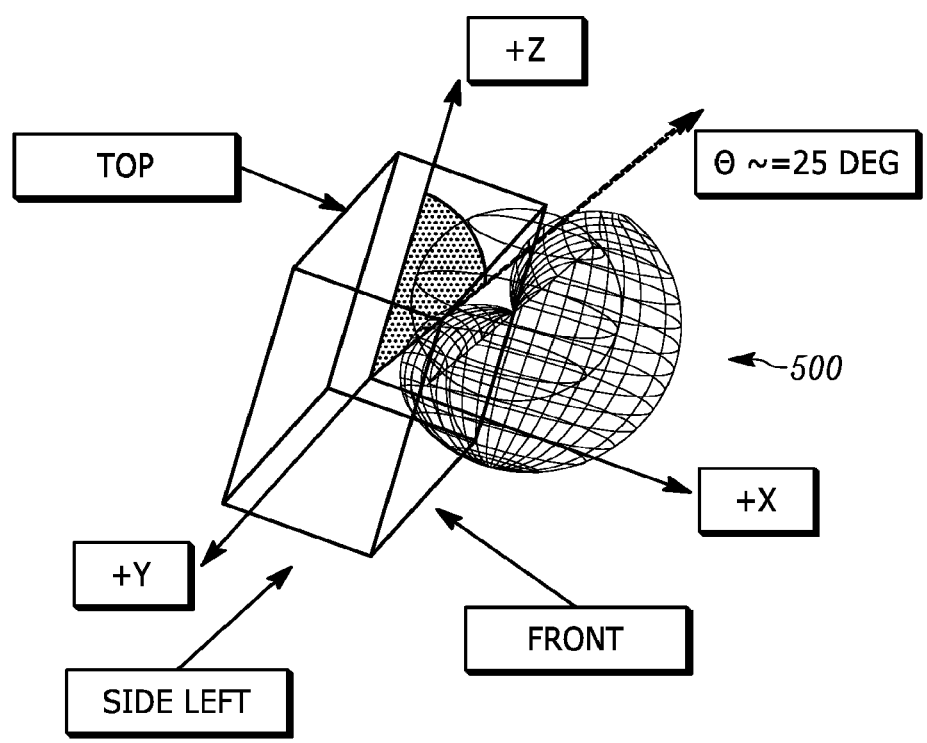
FIG. 5 illustrates a first example radiation pattern for one or more of the CITs of FIGS. 1-3.

In the example of FIGS. 3 and 4, the first and second CITs 308 and 310 are mounted to the upper shelves 300 and 302 such that the directional radiation pattern of the corresponding antennas 200 are aimed downward towards a floor of the container 102a. That is, the antennas 200 of the first and second CITs 308 and 310, which are mounted to the upper shelves 300 and 302, are vertically tilted downward. In some examples, the antennas 200 of the first and second CITs 308 and 310 are additionally aimed inward towards a center 404 of the container 102a. That is, the antennas 200 of the first and second CITs 308 and 310 are oriented sideways towards the center 404 of the container 102a. FIG. 5 illustrates an example radiation pattern 500 for the first and second CITs 308 and 310 of FIGS. 3 and 4. As shown in FIG. 5, the example radiation pattern 500 includes a vertical tilt of twenty-five (25) degrees from a vertical (Z) axis. As such, energy radiating from the first and second CITs 308 and 310 is directed towards a floor of the container 102a. Additionally, the example radiation pattern 500 of FIG. 5 is directed in a horizontal (X) direction corresponding to the center 404 of the container 102a.

Figure 6:
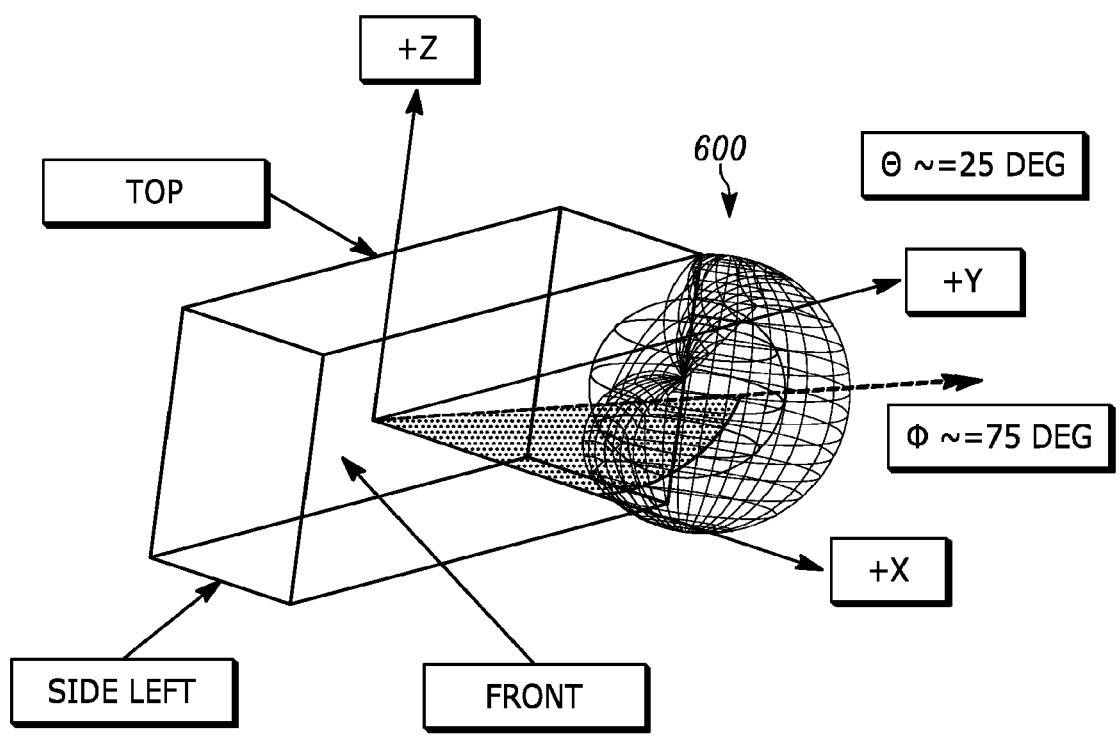
FIG. 6 illustrates a second example radiation pattern for one or more of the CITs of FIGS. 1-3.

In the example of FIGS. 3 and 4, the third and fourth CITs 312 and 314 are mounted to the bottom shelves 304 and 306 such that the directional radiation pattern of the corresponding antennas 200 are aimed toward the front region 400 of the container 102a. That is, the antennas 200 of the third and fourth CITs 312 and 314 are sideways oriented away from a door 408 of the container 102a. FIG. 6 illustrates an example radiation pattern 600 for the third and fourth CITs 312 and 314 of FIGS. 3 and 4. As shown in FIG. 6, the example radiation pattern 600 is horizontally oriented at a seventy-five (75) degree angle towards the front region 400 of the container 102a. As such, energy radiating from the third and fourth CITs 312 and 314 is directed away from the door 408.

In the example of FIGS. 3 and 4, the range setting 206 for the first and second CITs 308 and 310 controls the transmit power of the corresponding antennas 200 to −16 dB. Further, the range setting 206 for the third and fourth CITs 312 and 314 controls the transmit power of the corresponding antennas 200 to −23 dB. Placement and transmit power of the CIT 112 are adjustable such that a status of the beacons within the corresponding container are strong (e.g., maximized) and the status of the beacons at the outside of the container are concise.

In the example of FIGS. 3 and 4, the first and second CITs 308 and 310 are spaced apart from the third and fourth CITs 312 and 314, respectively, by a distance of one hundred and thirty-two (132) feet for a first type of container (e.g., a container having a roll up style door) and by a distance of one hundred and twenty (120) feet for a second type of container (e.g., a container have swing out style doors). In the example of FIGS. 3 and 4, the third and fourth CITs 312 and 314 are each spaced apart from the door 408 by a distance of thirteen (13) feet for the first type of container and by a distance of ten (10) feet for the second type of container.

In the illustrated example, the CITs 112 are strategically positioned to account for a possibility that the mobile computing device 108 may be worn by the loader 104 in different positions (e.g., on a belt, on an arm, as a heads-up display, etc.). In particular, the CITs are positioned in the container 102 at one or more heights depending on, for example, antenna propagation characteristic(s) such as directionality and/or a polarization property. In some examples, one or more of the CITs 112 are positioned at one height and other one(s) of the CITs 112 are positioned at another, different height. As such, example arrangements disclosed herein provide a plurality of patterns at a plurality of heights in the container 102 to increase (e.g., maximize) a likelihood that the transmissions are received at the mobile computing device 108.

While FIGS. 3 and 4 illustrate an example arrangement and configuration for the CITs 112, additional or alternative arrangements and/or configurations are possible to focus the beacons generated by the CITs 112 into the interior space of the corresponding container 102.

Figure 7:
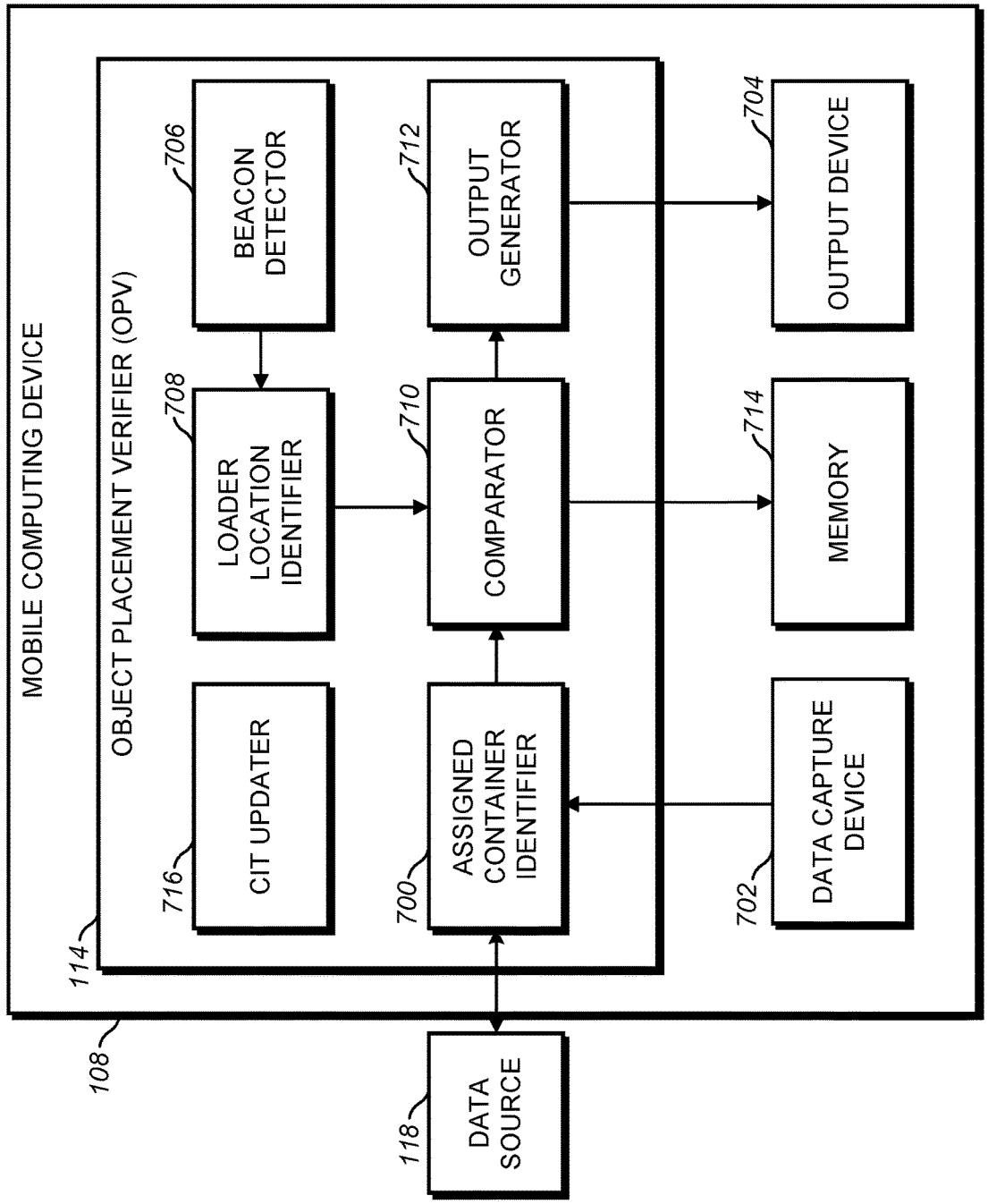
FIG. 7 is a block diagram representative of an example implementation of the object placement verifier (OPV) of FIG. 1.

FIG. 7 illustrates an example implementation of the OPV 114 implemented on the example mobile computing device 108 of FIG. 1. The example OPV 114 of FIG. 7 includes an assigned container identifier 700 that determines which of the containers 102a-c is the assigned container for a package currently being handled by the loader 104. In the illustrated example, the assigned container identifier 700 of the OPV 114 receives data from data capture device 702 of the mobile computing device 108, which has captured the indicia 110 of the package 106 being handled by the loader 104. Alternatively, the assigned container identifier 700 of the OPV 114 receives data from a data capture device of the workstation 116. For example, as the loader 104 picks up the package 106 to be loaded into one of the containers 102a-c, the loader 104 uses a barcode scanner to scan the indicia 110 and the captured data is provided to the assigned container identifier 700. Alternatively, as the loader 104 picks up the package 106 to be loaded into one of the containers 102a-c, the loader uses an RFID reader to read a code stored in an RFID tag adhered to the package 106.

The example assigned container identifier 700 queries the data source 118 with the received data (e.g., barcode data or a code provide by an RFID tag) to determine which of the containers 102a-c is the assigned container for the package 106. In the illustrated example, the data source 118 returns a container ID corresponding to the first container 102a. In the illustrated example, the loader 104 is responsively provided with an instruction regarding the assigned one of the containers 102a-c for the package 106. For example, the container ID may be displayed to the loader 104 via a display device 704 of the mobile computing device 108.

The example OPV 114 of FIG. 7 includes a beacon detector 706 and a loader location identifier 708 to determine a current (e.g., real time) location of the mobile computing device 106 associated with the loader 104. In particular, the example beacon detector 706 is, for example, an antenna capable of receiving transmission from the CITs 112 mounted in the containers 102a-c. Thus, when the mobile computing device 108 is located in the first container 102a, the beacon detector 706 receives beacons originating from the first CITs 112a. When the mobile computing device 108 is located in the second container 102b, the beacon detector 706 receives beacons originating from the second CITs 112b. When the mobile computing device 108 is located in the third container 102c, the beacon detector 706 receives beacons originating from the third CITs 112c. As described above, the beacons generated by the CITs 112a-c include the container identifying data 202. The example loader location identifier 708 extracts the container identifying data 202, thereby obtaining a current location of the mobile computing device 108 if the loader 104 has entered one of the containers 102a-c.

The example OPV 114 of FIG. 7 includes a comparator 710 to determine whether the container ID obtained by the assigned container identifier 700 corresponds to the container identifying data 202 obtained by the loader location identifier 708. If not, the comparator determines that the loader 104 is about to or has incorrectly loaded the package 106 into the incorrect one of the containers 112a-c. For example, if the container ID obtained by the assigned container identifier 700 corresponds to the first container 102a and the container identifying data 202 obtained by the loader location identifier 708 corresponds to the second container 102b, the comparator 710 determines that the loader 104 is in the incorrect container 102b for the package 106 (i.e., the most recently scanned package). On the other hand, if the obtained container ID corresponds to the obtained container identifying data 202, the comparator 710 determines that the package 106 is being correctly loaded.

The example OPV 114 of FIG. 7 includes an output generator 712 that receives data indicative of the result of the determination performed by the comparator 710. The example output generator 712 is in communication with the output device 704 of the mobile computing device 108. The example output generator 712 causes the output device 704 to generate an alert, such as a buzzer sound, a symbol on a display, and/or a red flashing light, when the package 106 is being incorrectly loaded. Additionally or alternatively, the output generator 712 cause the output device 704 to generate a different alert, such as a pleasant tone and/or a green light, when the package 106 is being correctly loaded.

In the example of FIG. 7, the OPV 114 stores timestamped data indicative of the obtained data (e.g., the container identifying data 202) and the determinations made by, for example, the comparator 710 in memory 714 of the mobile computing device 108. The example memory 714 is accessible by, for example, the workstation 116 and/or any other suitable device.

The example OPV 114 of FIG. 7 includes a CIT updater 716 to obtain current values (e.g., the container identifying data 202) and/or configuration settings (e.g., the range setting 206) of individual ones of the CITs 112a-c to, if necessary, update the same. For example, the CIT updater 716 changes the container identifying data 202 when the corresponding CIT 112 is being deployed in a different container by, for example, interacting with the parameter manager 204 of the CIT 112. Additionally or alternatively, the example CIT updater 716 changes the range setting 206 when the corresponding CIT 112 is being deployed in a differently sized container, at a different position in the container 102, and/or if it is determined that the corresponding CIT 112 is generating signals too strongly or too weakly.

Figure 8:
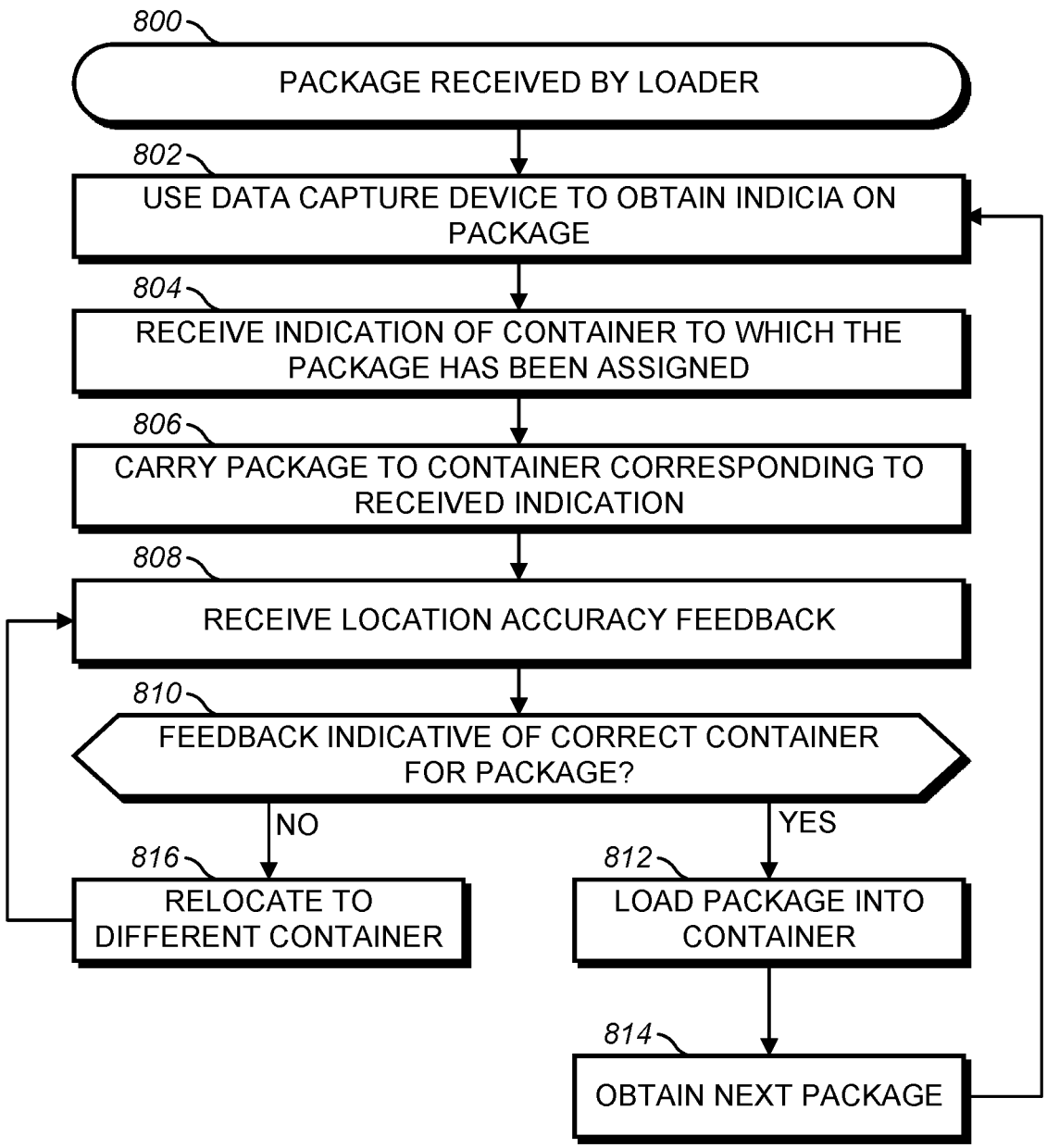
FIG. 8 is flowchart representative of an example workflow for the loader of FIG. 1 enabled by the example locating system of FIG. 1.

FIG. 8 illustrates an example workflow of the loader 104 while using the example locating system of FIG. 1 including the OPV 114 and the CITs 112a-c. In the example of FIG. 8, the loader 104 picks up the package 106 because, for example, the package 106 is the next package to be loaded into the containers 102a-c (block 800). In some examples, the package 106 is delivered to the loader 104 via a conveyor belt system, a slide, or moving cages. The example loader 104 uses a data capture device, such as a ring scanner in wired communication with the mobile computing device 108, to capture the indicia 110 carried by the package 106 (block 802). As described above, the mobile computing device 108 provides the loader 104 with an indication of which of the containers 102a-c has been assigned to the package 106 (e.g., by a central system implementing a planning algorithm) (block 804). With the assigned container 102a-c in mind and the package 106 in hand, the loader 104 travels to one of the containers 102a-c believed to be the assigned one of the containers 102a-c (block 806).

Figure 9:
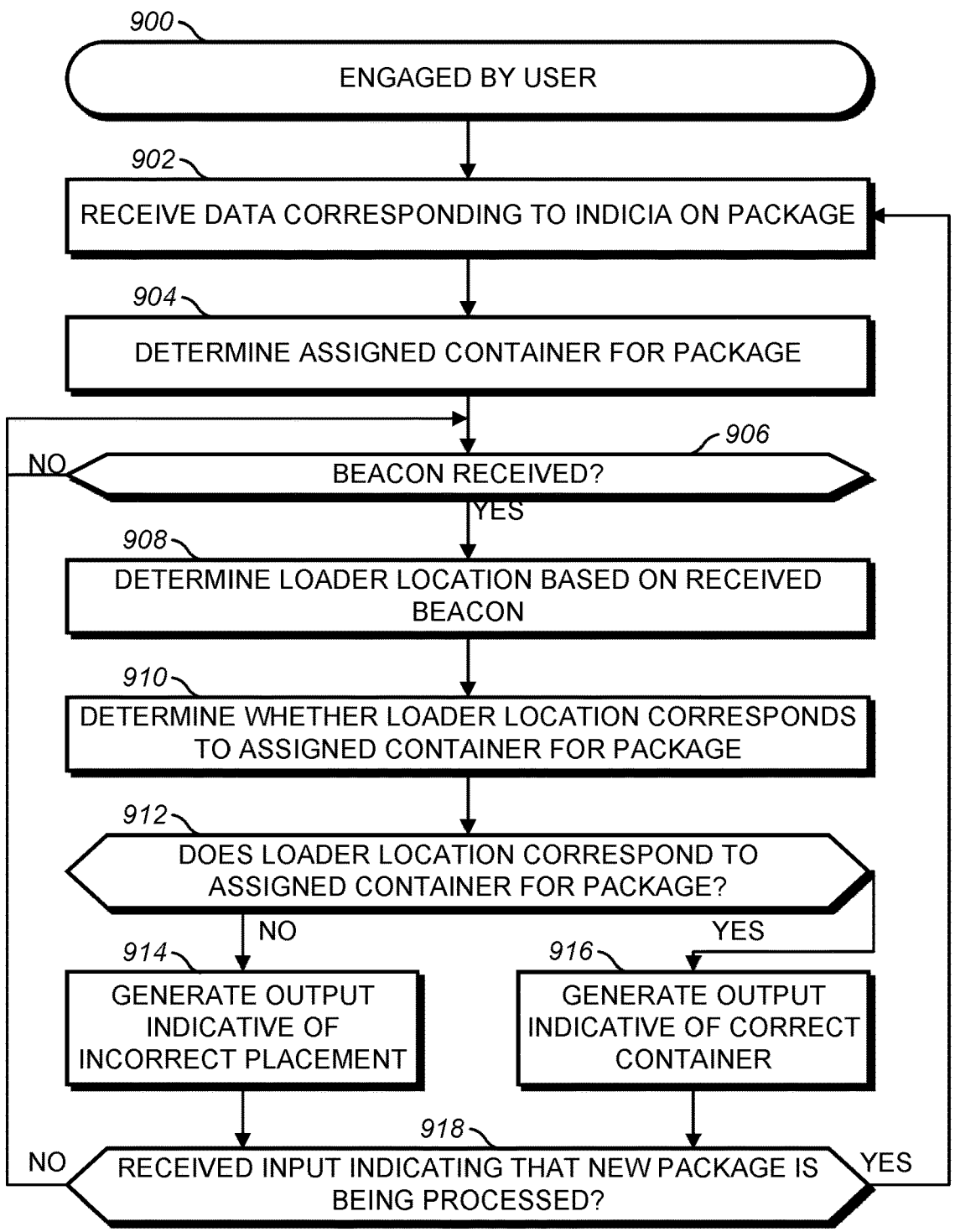
FIG. 9 is a flowchart representative of example operations that may be executed to implement the example OPV of FIGS. 1 and/or 7.

In response to the loader 104 entering one of the containers 102a-c, the OPV 114 determines whether the loader 104 is in the process of placing the package 106 in the correct one of the containers 102a-c and provides an indication to the loader 104 as to the determination. Thus, in response to the loader 104 entering one of the containers 102a-c, the loader 104 receives feedback from the mobile computing device 108 such as, for example, a red flashing light combined with an unpleasant or a green flashing light combined with a pleasant sound (block 808). If the feedback is indicative of the loader 104 being in the correct one of the containers 102a-c (block 810), the loader 104 places the package 106 in the container 102a-c (block 812) and obtains the next package (block 814). On the other hand, if the feedback is indicative of the loader being in an incorrect one of the containers 102a-c (block 810), the loader 104 relocates the package 106 to a different one of the containers (block 816) until the package 106 is correctly loaded FIG. 9 is a flowchart representative of example operations executed by the example OPV 114 of FIGS. 1 and/or 7. The example of FIG. 9 begins with the mobile computing device 108 being engaged by (e.g., powered on by) the loader 104 (block 900). When the loader 104 selects or is given the package 106, the loader 104 uses the data capture device 702 of the mobile computing device 108 (or any other suitable data capture device) to determine one of the containers 102a-c to which the package 106 has been assigned. For example, the loader 104 uses the data capture device (e.g., a barcode scanner or an RFID reader) to capture the indicia 110 (e.g., a barcode or a code carried by an RFID tag) carried by the package 106. In the example assigned container identifier 700 of the OPV 114 receives the captured data (block 902) and uses the received data to query the data source 118 to determine an assigned one of the containers 102a-c for the package 106 (block 904). For example, the data source 118 returns a container ID indicative of the assigned one of the containers 102a-c for the package 106.

In the example of FIG. 9, the beacon detector 706 of the OPV 114 is capable of detecting beacons generated by the CITs 112a-c. If the beacon detector 706 receives such beacons (block 906), the loader location identifier 708 determines a current location of the mobile computing device 108 and, thus, the loader 104, based on the received beacon (block 908). For example, the loader location identifier 108 identifies the container identifying data 202 carried by the beacon and, thus, determines which of the containers 102a-c corresponds to the received beacon.

The example comparator 710 is provided with the container identifying data 202 and the assigned one of the containers 102a-c for the package 106. The example comparator 710 uses the provided information determine whether the loader 104, who is currently handling the package 106 marked with the indicia 110, is currently located in the assigned one of the containers 102a-c for the package 106 (block 910). If the comparator 710 determines that the loader 104 is incorrectly loading the package 106 (i.e., that the mobile computing device 106 associated with the loader 104 is located in one of the containers 102a-c other than the assigned one of the containers 102a-c) (block 912), the output generator 712 generates an output indicative of an incorrect placement of the package 106 (block 914). Conversely, if the comparator 710 determines that the loader 104 is correctly loading the package 106 (i.e., that the mobile computing device 106 associated with the loader 104 is located in the assigned one of the containers 102a-c for the package 106), the output generator 712 generates an output indicative of a correct placement of the package 106 (block 916). Alternatively, if the comparator 710 determines that the loader 104 is correctly loading the package 106, the output generator 712 does not generate an output, which can be taken by the loader 104 to mean that the package 106 is being loaded correctly. If the OPV 114 receives an indication that a new package is being handled by the loader 104 (e.g., if data corresponding to new indicia is received) (block 918), control proceeds to block 902. Otherwise, control proceeds to from block 918 to block 906.

Figure 10:
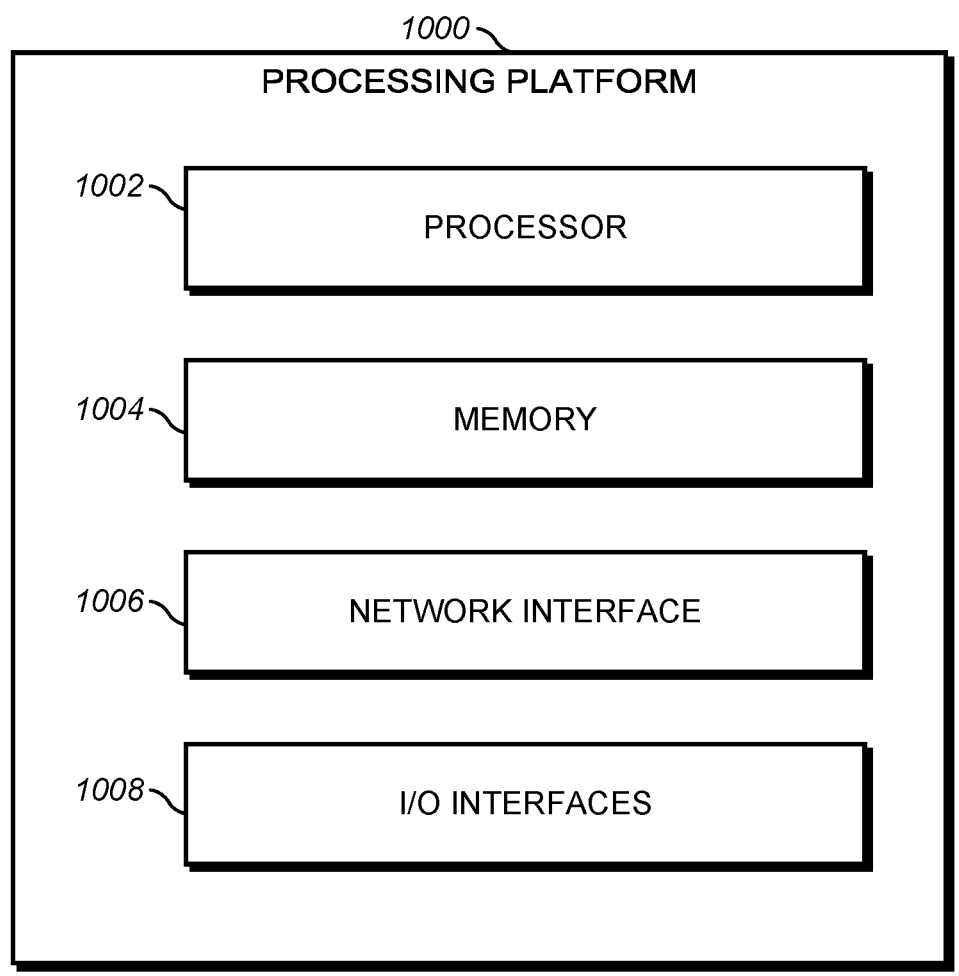
FIG. 10 is a block diagram of an example logic circuit for implementing the example operations of FIG. 9 to implement the example OPV of FIGS. 1 and/or 7.

FIG. 10 is a block diagram representative of an example logic circuit that may utilized to implement, for example, the mobile computing device 108, the example OPV 114 of FIGS. 1 and/or 7, the example CITs 112a-c of FIGS. 1 and/or 2 and/or the example workstation 116 of FIG. 1. The example logic circuit of FIG. 10 is a processing platform 1000 capable of executing instructions to, for example, implement the example operations represented by the flowcharts of the drawings accompanying this description. As described below, alternative example logic circuits include hardware (e.g., a gate array) specifically configured for performing operations represented by the flowcharts of the drawings accompanying this description.

The example processing platform 1000 of FIG. 10 includes a processor 1002 such as, for example, one or more microprocessors, controllers, and/or any suitable type of processor. The example processing platform 1000 of FIG. 10 includes memory (e.g., volatile memory, non-volatile memory) 1004 accessible by the processor 1002 (e.g., via a memory controller). The example processor 1002 interacts with the memory 1004 to obtain, for example, machine-readable instructions stored in the memory 1004 corresponding to, for example, the operations represented by the flowcharts of this disclosure. Additionally or alternatively, machine-readable instructions corresponding to the example operations of the flowcharts may be stored on one or more removable media (e.g., a compact disc, a digital versatile disc, removable flash memory, etc.) that may be coupled to the processing platform 1000 to provide access to the machine-readable instructions stored thereon.

The example processing platform 1000 of FIG. 10 includes a network interface 1006 to enable communication with other machines via, for example, one or more networks. The example network interface 1006 includes any suitable type of communication interface(s) (e.g., wired and/or wireless interfaces) configured to operate in accordance with any suitable protocol(s).

The example processing platform 1000 of FIG. 10 includes input/output (I/O) interfaces 1008 to enable receipt of user input and communication of output data to the user.

The above description refers to block diagrams of the accompanying drawings. Alternative implementations of the examples represented by the block diagrams include one or more additional or alternative elements, processes and/or devices. Additionally or alternatively, one or more of the example blocks of the diagrams may be combined, divided, re-arranged or omitted. Components represented by the blocks of the diagrams are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations represented by the flowcharts of this disclosure). Some example logic circuits are hardware that executes machine-readable instructions to perform operations (e.g., one or more of the operations represented by the flowcharts of this disclosure). Some example logic circuits include a combination of specifically configured hardware and hardware that executes machine-readable instructions.

The above description refers to flowcharts of the accompanying drawings. The flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations represented by the flowcharts are implemented by machine-readable instructions (e.g., software and/or firmware) stored on a medium (e.g., a tangible machine-readable medium) for execution by one or more logic circuits (e.g., processor(s)). In some examples, the operations represented by the flowcharts are implemented by one or more configurations of one or more specifically designed logic circuits (e.g., ASIC(s)). In some examples the operations of the flowcharts are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Although certain example apparatus, methods, and articles of manufacture have been disclosed herein, the scope of coverage of this patent is not limited thereto. On the contrary, this patent covers all apparatus, methods, and articles of manufacture fairly falling within the scope of the claims of this patent.

What is claimed is:

1. A system comprising:
    transmitters mounted within a container, wherein each one of the transmitters includes a directional antenna configured to direct transmissions from the directional antenna inwardly towards a center of the container to diminish a strength of the transmission outside of the container;
    a receiver having an assigned container identifier, the receiver configured to:
        in response to receiving the transmissions from the transmitters, determine a location of the receiver based on the transmissions;
        compare the location of the receiver with the assigned container identifier; and
        when the location of the receiver is different than the assigned container identifier, generate an alert.

2. The system of claim 1, wherein the receiver is a mobile computing device.

3. The system of claim 1, wherein:
    a first subset of the transmitters is mounted at a first elevation within the container;
    a second subset of the transmitters is mounted at a second elevation within the container; and
    the first elevation is different than the second elevation.

4. The system of claim 1, wherein a first subset of the transmitters is directed away from an opening of the container.

5. The system of claim 1, wherein a first subset of the transmitters is mounted on a shelf within the container.

6. The system of claim 1, wherein each of the transmitters is configured to transmit at a respective power level to diminish the strength of the transmission outside of the container.

7. The system of claim 1, wherein the generated alert is a buzzer sound.

8. The system of claim 1, wherein the generated alert is a flashing light.

9. The system of claim 1, further comprising when the location of the receiver is the same as the assigned container identifier, generate a confirmation output.

* * * * *